(12) United States Patent
Kataoka et al.

(10) Patent No.: US 11,949,113 B2
(45) Date of Patent: Apr. 2, 2024

(54) ELECTRODE CATALYST FOR FUEL CELL, AND FUEL CELL USING SAME

(71) Applicants: CATALER CORPORATION, Kakegawa (JP); TOYOTA JIDOSHA KABUSHIKI KAISHA, Toyota (JP)

(72) Inventors: Mikihiro Kataoka, Kakegawa (JP); Kotaro Horiai, Kakegawa (JP); Tomoaki Terada, Kakegawa (JP); Yusuke Itoh, Nagoya (JP); Mikihiro Hori, Nagoya (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 427 days.

(21) Appl. No.: 16/979,616

(22) PCT Filed: Mar. 13, 2019

(86) PCT No.: PCT/JP2019/010387
§ 371 (c)(1),
(2) Date: Sep. 10, 2020

(87) PCT Pub. No.: WO2019/177060
PCT Pub. Date: Sep. 19, 2019

(65) Prior Publication Data
US 2021/0043947 A1 Feb. 11, 2021

(30) Foreign Application Priority Data
Mar. 16, 2018 (JP) .................................. 2018-049227

(51) Int. Cl.
*H01M 4/92* (2006.01)
*H01M 4/96* (2006.01)
*B01J 35/60* (2024.01)

(52) U.S. Cl.
CPC ............. *H01M 4/926* (2013.01); *H01M 4/96* (2013.01); *B01J 35/60* (2024.01)

(58) Field of Classification Search
None
See application file for complete search history.

(56) References Cited

U.S. PATENT DOCUMENTS

2005/0238936 A1    10/2005    Cho
2009/0233135 A1    9/2009    Horiuchi et al.
(Continued)

FOREIGN PATENT DOCUMENTS

JP    2005-135817 A    5/2005
JP    2005-166409 A    6/2005
(Continued)

OTHER PUBLICATIONS

Jun. 11, 2019 International Search Report issued in International Patent Application No. PCT/JP2019/010387.
(Continued)

*Primary Examiner* — Tracy M Dove
(74) *Attorney, Agent, or Firm* — Oliff PLC

(57) ABSTRACT

An electrode catalyst for a fuel cell, the electrode catalyst having high initial activity and being capable of long-term retention of said activity; and a fuel cell using the electrode catalyst for a fuel cell. The electrode catalyst for a fuel cell includes catalyst metal particles that include platinum or a platinum alloy, and carrier particles that carry said catalyst metal particles, wherein the carrier particles are a carbonaceous material having a cumulative pore volume of 0.10 cc/g or less in the diameter range of 2 nm or less, and a BET specific surface area of greater than 900 $m^2$/g; and a fuel cell comprising the electrode catalyst for a fuel cell.

18 Claims, 1 Drawing Sheet

(56) References Cited

U.S. PATENT DOCUMENTS

| | | |
|---|---|---|
| 2011/0058308 A1 | 3/2011 | Nishi et al. |
| 2013/0244137 A1 | 9/2013 | Tada et al. |
| 2015/0352522 A1 | 12/2015 | Mizuuchi et al. |
| 2016/0072134 A1 | 3/2016 | Ohma et al. |
| 2017/0194652 A1 | 7/2017 | Ijima et al. |
| 2017/0326527 A1 | 11/2017 | Kume et al. |
| 2017/0338495 A1 | 11/2017 | Horiuchi et al. |
| 2018/0261866 A1 | 9/2018 | Takahashi et al. |
| 2019/0030514 A1 | 1/2019 | Uchida et al. |

FOREIGN PATENT DOCUMENTS

| | | |
|---|---|---|
| JP | 2005-317546 A | 11/2005 |
| JP | 2008-269850 A | 11/2008 |
| JP | 2009-140657 A | 6/2009 |
| JP | 2012-124001 A | 6/2012 |
| JP | 2012-236138 A | 12/2012 |
| JP | 2012-248365 A | 12/2012 |
| JP | 2013-252483 A | 12/2013 |
| JP | 5481748 B2 | 4/2014 |
| JP | 2016-160170 A | 9/2016 |
| JP | 2017-212217 A | 11/2017 |
| WO | 2007/055411 A1 | 5/2007 |
| WO | 2014/129597 A1 | 8/2014 |
| WO | 2015/141810 A1 | 9/2015 |
| WO | 2016/063968 A1 | 4/2016 |
| WO | 2017/042919 A1 | 3/2017 |
| WO | 2017/094648 A1 | 6/2017 |

OTHER PUBLICATIONS

Jun. 11, 2019 Written Opinion of the International Searching Authority issued in International Patent Application No. PCT/JP2019/010387.

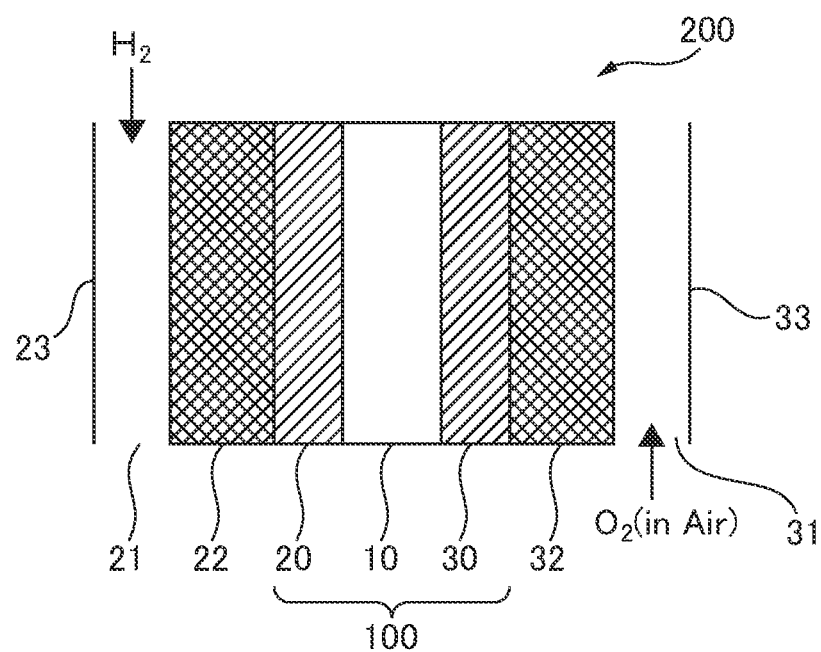

ELECTRODE CATALYST FOR FUEL CELL, AND FUEL CELL USING SAME

FIELD

The present invention relates to an electrode catalyst for a fuel cell and a fuel cell using the same.

BACKGROUND

Since fuel cells have high power generation efficiency, are easy to miniaturize, and have little adverse impact on the environment, the use thereof in various fields including personal computers, mobile devices such as mobile phones, and vehicles such as automobiles and trains is expected.

Fuel cells are composed of a pair of electrodes and an electrolyte, and the electrodes include an electrode catalyst composed of catalyst metal particles and a carrier on which they are carried. In general, carbon has conventionally been used as the carrier for fuel cells and platinum or a platinum alloy has been used as the carrier metal particles.

There is a demand for fuel cells which have a high initial electrode catalyst activity and which can maintain such activity for long periods of time, and many technologies for this objective have been reported (Patent Literature 1 to 8).

CITATION LIST

Patent Literature

[PTL 1] Japanese Unexamined Patent Publication (Kokai) No. 2012-124001
[PTL 2] Japanese Unexamined Patent Publication (Kokai) No. 2013-252483
[PTL 3] Japanese Unexamined Patent Publication (Kokai) No. 2012-248365
[PTL 4] Japanese Unexamined Patent Publication (Kokai) No. 2012-236138
[PTL 5] Japanese Unexamined Patent Publication (Kokai) No. 2005-317546
[PTL 6] Japanese Unexamined Patent Publication (Kokai) No. 2005-166409
[PTL 7] Japanese Unexamined Patent Publication (Kokai) No. 2009-140657
[PTL 8] WO 2016/063968
[PTL 9] WO 2014/129597
[PTL 10] Japanese Patent No. 5481748
[PTL 11] WO 2015/141810
[PTL 12] WO 2017/094648
[PTL 13] Japanese Unexamined Patent Publication (Kokai) No. 2016-106170

SUMMARY

Technical Problem

The present invention aims to provide an electrode catalyst for a fuel cell which has a high initial electrode catalyst activity and which can maintain such activity for long periods of time, and a fuel cell using the same.

Solution to Problem

The present inventors have discovered that the above object can be achieved by the present invention having the following aspects.

<<Aspect 1>>
An electrode catalyst for a fuel cell comprising catalyst metal particles containing platinum or a platinum alloy and carrier particles on which the catalyst metal particles are carried, wherein the carrier particles are a carbonaceous material having a cumulative pore volume of pores having a diameter of 2 nm or less of 0.10 cc/g or less and a BET specific surface area of more than 900 $m^2/g$.

<<Aspect 2>>
The electrode catalyst for a fuel cell according to Aspect 1, wherein the carbonaceous material has a cumulative pore volume of pores having a diameter of 6 nm or less of 0.25 cc/g or more.

<<Aspect 3>>
The electrode catalyst for a fuel cell according to Aspect 1 or Aspect 2, wherein the total pore volume of the carrier particles is 1.0 cc/g or more.

<<Aspect 4>>
The electrode catalyst for a fuel cell according to any one of Aspect 1 to Aspect 3, wherein the carbonaceous material has a BET specific surface area of 1500 $m^2/g$ or less.

<<Aspect 5>>
The electrode catalyst for a fuel cell according to any one of Aspect 1 to Aspect 4, wherein the ratio of the number of the catalyst metal particles having a diameter of 2 nm or less is 23% or less with respect to the total number of the catalyst metal particles.

<<Aspect 6>>
The electrode catalyst for a fuel cell according to any one of Aspect 1 to Aspect 4, wherein the number average particle size of the catalyst metal particles is 2.8 to 4.0 nm.

<<Aspect 7>>
A fuel cell comprising the electrode catalyst according to any one of Aspect 1 to Aspect 6.

BRIEF DESCRIPTION OF DRAWINGS

FIG. 1 illustrates an aspect of a fuel cell.

DESCRIPTION OF EMBODIMENTS

The electrode catalyst for a fuel cell of the present invention catalyst metal particles containing platinum or a platinum alloy and carrier particles on which the catalyst metal particles are carried. The carrier particles are a carbonaceous material having a cumulative pore volume of pores having a diameter of 2 nm or less of 0.10 cc/g or less and a BET specific surface area of more than 900 $m^2/g$.

Patent Literature 12 discloses that the dispersibility of catalyst metal particles can be increased by using carrier particles having a reduced cumulative volume of pores having a diameter of 6 nm or less and a BET specific surface area within a suitable range, whereby fuel cell output can be improved. In particular, Patent Literature 12 discloses that when carrier particles having a BET specific surface area of more than 900 $m^2/g$ are used, the catalyst metal particles become buried in the fine pores of the carrier particles, whereby the number of effectively functioning catalyst metal particles is reduced and output is reduced.

However, the present inventors have discovered that even when a carbonaceous material having a BET specific surface area of more than 900 $m^2/g$ is used as the carrier particles, an electrode catalyst for a fuel cell which has a high initial electrode catalyst activity and which can maintain such activity for long periods of time can be obtained when the cumulative volume of the pores having a diameter of 2 nm or less is 0.10 cc/g or less.

Though not bound by theory, in the electrode catalyst for a fuel cell of the present invention, by using a carbonaceous material having a BET specific surface area of more than 900 m$^2$/g, agglomeration of the catalyst metal particles can be prevented, whereby catalyst metal particles having a relatively small particle diameter can be carried on the carrier particles in a highly-dispersed state. By limiting the cumulative volume of pores having a diameter of 2 nm or less of the carbonaceous material to 0.10 cc/g or less, burial of the catalyst metal particles in the fine pores can be suppressed, and the proportion of catalyst metal particles having a diameter of 2 nm or less can be reduced. Since catalyst metal particles having a diameter of 2 nm or less tend to have many weak crystal faces and low catalytic activity and thus may act as the starting points of catalyst deterioration, it is believed that the electrode catalyst for a fuel cell of the present invention, in which the amount of such catalyst metal particles is reduced and the amount of catalyst metal particles having a particle diameter greater than 2 nm and a relatively small size is increased, has high initial activity and can maintain such activity for long periods of time.

<Carrier Particles>

The carrier particles used in the present invention are a carbonaceous material having a cumulative volume of pores having a diameter of 2 nm or less of 0.10 cc/g or less and a BET specific surface area of 900 m$^2$/g or more. Since many small diameter fine pores are generally present in carbonaceous materials having a high BET specific surface area, a carbonaceous material having a cumulative volume of pores having a diameter of 2 nm or less of 0.10 cc/g or less and a BET specific surface area of 900 m$^2$/g or more has few very small pores (diameter of 2 nm or less), but is considered to be a carbonaceous material having many comparatively small fine pores (for example, fine pores having a diameter of 2 nm to 6 nm or a diameter of 2 nm to 10 nm).

In the present description, cumulative pore volume is a value measured with a gas adsorption amount measurement device ("Tri-Star 3000" manufactured by Shimadzu Corporation) by the BJH method at a measurement temperature of 77.4 K using nitrogen gas as the adsorbate.

The cumulative volume of pores having a diameter of 2 nm or less of the carbonaceous material of the carrier particles used in the present invention may be 0.20 cc/g or less, 0.10 cc/g or less, or 0.08 cc/g or less, and may be 0.01 cc/g or more, 0.03 cc/g or more, 0.05 cc/g or more, 0.06 cc/g or more, or 0.08 cc/g or more. For example, the cumulative volume of pores having a diameter of 2 nm or less may be 0.01 cc/g to 0.20 cc/g or 0.03 cc/g to 0.10 cc/g.

It is preferable that the cumulative volume of pores having a diameter of 2 nm or less of the carbonaceous material of the carrier particles used in the present invention be reduced as described above, and it is preferable that the cumulative volume of pores having a diameter of 6 nm or less be comparatively high. For example, the cumulative volume of pores having a diameter of 6 nm or less of the carbonaceous material may be 0.25 cc/g or more, 0.30 cc/g or more, 0.40 cc/g or more, 0.50 cc/g or more, 0.60 cc/g or more, or 0.80 cc/g or more, and may be 1.20 cc/g or less, 1.00 cc/g or less, 0.90 cc/g or less, or 0.80 cc/g or less. For example, the cumulative volume of pores having a diameter of 6 nm or less may be 0.25 cc/g to 1.20 cc/g or 0.50 cc/g to 1.00 cc/g.

The cumulative volume of pores having a diameter of 10 nm or less of the carbonaceous material may be 0.50 cc/g or more, 0.60 cc/g or more, 0.70 cc/g or more, 0.80 cc/g or more, or 0.90 cc/g or more, and may be 1.50 cc/g or less, 1.30 cc/g or less, 1.10 cc/g or less, 1.00 cc/g or less, 0.90 cc/g or less, or 0.80 cc/g or less. For example, the cumulative volume of pores having a diameter of 10 nm or less may be 0.50 cc/g to 1.50 cc/g or 0.70 cc/g to 1.00 cc/g.

The total cumulative pore volume of the carbonaceous material may be 0.80 cc/g or more, 0.90 cc/g or more, 1.00 cc/g or more, 1.10 cc/g or more, or 1.20 cc/g or more, and may be 2.00 cc/g or less, 1.50 cc/g or less, 1.30 cc/g or less, or 1.20 cc/g or less. For example, the total cumulative pore volume may be 0.80 cc/g to 2.00 cc/g or 1.00 cc/g to 1.50 cc/g.

The ratio of the cumulative volume of pores having a diameter of 2 nm or less to the total cumulative pore volume of the carbonaceous material may be 0.20 or less, 0.10 or less, 0.08 or less, or 0.06 or less, and may be 0.01 or more, 0.03 or more, 0.05 or more, or 0.06 or more. The ratio of the cumulative volume of pores having a diameter of 6 nm or less to the total cumulative pore volume of the carbonaceous material may be 0.80 or less, 0.70 or less, or 0.60 or less, and may be 0.40 or more, 0.50 or more, or 0.60 or more. For example, the ratio may be 0.01 to 0.50 or 0.02 to 0.10.

The BET specific surface area of the carbonaceous material may be 900 m$^2$/g or more, 950 m$^2$/g or more, 1000 m$^2$/g or more, or 1100 m$^2$/g or more, and may be 2500 m$^2$/g or less, 2000 m$^2$/g or less, 1800 m$^2$/g or less, 1500 m$^2$/g or less, 1200 m$^2$/g or less, or 1000 m$^2$/g or less. It can be understood that when the BET specific surface area is within such ranges, the particle size of the platinum alloy to be obtained is of a suitable size and comparatively uniform. BET specific surface area can be measured in accordance with JIS K6217-2. For example, the BET specific surface area may be 900 m$^2$/g to 1500 m$^2$/g or 900 m$^2$/g to 1200 m$^2$/g.

The type of the carbonaceous material is not particularly limited as long as it satisfies the pore volumes and BET specific surface area described above, and examples thereof include graphite, activated carbon, carbon black, carbon nanotubes, solid carbon, hollow carbon, dendritic carbon, and combinations thereof. The carbon materials described in Patent Literature 8 can serve as examples of solid carbon and hollow carbon, and the carbon materials described in Patent Literature 9 to 11 can serve as examples of dendritic carbon. The porous carbon material described in Patent Literature 13 may be used.

The average particle diameter of the carrier particles may preferably be 30 μm or less, 20 μm or less, or 10 μm or less, and may be 0.1 μm or more, 0.5 μm or more, 1.0 μm or more, 5.0 μm or more, or 10 μm or more. For example, the average particle diameter may be 0.1 μm to 30 μm or 1.0 μm to 10 μm. In this case, the average particle diameter can be calculated from the number average equivalent diameter based on a large number of photographs captured at arbitrary positions with an electron microscope. Note that equivalent diameter is the diameter of a perfect circle having an outer peripheral length equal to the outer peripheral length of the surface.

When the carbonaceous material of the carrier particles described above is, for example, carbon black, by activating the carbon black as a raw material to obtain carbon black having a very high BET specific surface area and thereafter carrying out heat treatment in an inert gas, the ratio of the cumulative volume of pores having a diameter of 2 nm or less can be reduced. Note that, the BET specific surface area of the activated carbon black is conventionally reduced by this heat treatment. Such heat treatment has been conventionally carried out to develop the crystallinity of carbon black, and examples thereof include heat treatment at 1500 to 2100° C. in an inert gas. As the raw material carbon black and the activation treatment, those known in the relevant field can be adopted.

<Catalyst Metal Particles>

The catalyst metal particles used in the present invention include platinum or a platinum alloy, and are preferably particles of platinum or a platinum alloy, and in particular, are preferably particles of a platinum alloy. It is preferable that the average particle diameter of the catalyst metal particles be in the range of 2.8 to 3.8 nm.

The average particle diameter of the catalyst metal particles may be 2.8 nm or more, 2.9 nm or more, 3.0 nm or more, 3.2 nm or more, or 3.4 nm or more, and may be 4.0 nm or less, 3.8 nm or less, 3.6 nm or less, 3.5 nm or less, or 3.4 nm or less. The standard deviation of the particle diameter of the catalyst metal particles may be 1.50 nm or less, 1.35 nm or less, 1.25 nm or less, 1.20 nm or less, 1.15 nm or less, 1.10 nm or less, or 1.05 nm or less, and may be 0.10 nm or more, 0.30 nm or more, 0.50 nm or more, 0.80 nm or more, 0.90 nm or more, or 0.95 nm or more. When the particle diameter of the catalyst metal particles is within such a range, the initial activity of the electrode catalyst is high, and there is a tendency for the activity to be maintained for long periods of time. For example, the average particle diameter of the catalyst metal particles may be 2.8 nm to 4.0 nm or 2.9 nm to 3.6 nm.

The average particle diameter of the catalyst metal particles is calculated from the X-ray diffraction measurement peak using analysis software JADE. In this case, the average particle diameter is the number average particle diameter. The standard deviation of the particle diameter of the catalyst metal particles can be calculated X-ray small angle scattering method using analysis software. An example of the analysis software is Nano-solver (produced by the Rigaku Corporation).

When the catalyst metal particles contain a platinum alloy, the type of the platinum alloy is not particularly limited as long as it functions as the electrode catalyst for a fuel cell. For example, the platinum alloy may be an alloy of a metal selected from the group consisting of iron, chromium, nickel, cobalt, terbium, yttrium, gadolinium, ruthenium and combinations thereof with platinum, is preferably an alloy of a metal selected from the group consisting of nickel, cobalt, terbium, yttrium, gadolinium, ruthenium and combinations thereof with platinum, and is particularly preferably an alloy of platinum and cobalt.

The molar ratio of platinum to the metal forming the platinum alloy may be 1 or more:1, 2 or more:1, 4 or more:1, 5 or more:1, or 10 or more:1, and may be 100 or less:1, 50 or less:1, 30 or less:1, 20 or less:1, or 10 or less:1. For example, the molar ratio of the alloy of platinum and cobalt may be in the range of 4:1 to 11:1.

The content of the catalyst metal particles in the electrode catalyst for a fuel cell of the present invention may be, using the total weight of the carrier particles and the catalyst metal particles as a baseline, 10 wt % or more, 20 wt % or more, 30 wt % or more, 35 wt % or more, 40 wt % or more, or 45 wt % or more, and may be 70 wt % or less, 60 wt % or less, 55 wt % or less, 50 wt % or less, 45 wt % or less, 40 wt % or less, or 35 wt % or less.

<<Fuel Cell>>

The fuel cell of the present invention comprises the electrode catalyst described above. The fuel cell may comprise an electrode having the electrode catalyst described above and an ionomer on a substrate, and an electrolyte, in particular a polymer electrolyte.

Examples of the type of ionomer include Nafion™ DE2020, DE2021, DE520, DE521, DE1020, and DE1021 produced by DuPont, as well as Aciplex™ SS700C/20, SS900/10, and SS1100/5 produced by Asahi Kasei Chemical Corporation.

Examples of the type of the fuel cell include polymer electrolyte fuel cells (PEFC), phosphoric acid fuel cells (PAFC), molten carbonate fuel cells (MCFC), solid oxide fuel cells (SOFC), alkaline electrolyte fuel cells (AFC), and direct fuel cells (DFC). Though not particularly limited, the fuel cell is preferably a polymer electrolyte fuel cell.

The electrode comprises the electrode catalyst described above may be used as a cathode, may be used as an anode, or may be used as both a cathode and an anode.

The fuel cell may further comprise a separator. By constructing a cell stack by stacking unit cells in which a membrane-electrode assembly (MEA) consisting of a pair of electrodes (cathode and anode) and an electrolyte membrane are interposed by a pair of separators, high power can be obtained. The fuel cell may further comprise a gas diffusion layer.

FIG. 1 shows a membrane-electrode assembly (100) in which an anode electrode layer (20) and a cathode electrode layer (30) each comprising the electrode described above are arranged on both surfaces of an electrolyte membrane (10) having proton conductivity. FIG. 1 shows a fuel cell (200) comprising a unit cell consisting of the membrane-electrode assembly (10), an anode-side gas flow path (21), an anode-side gas diffusion layer (22), an anode-side separator (23), a cathode-side gas flow path (31), a cathode-side gas diffusion layer (32), and a cathode-side separator (33).

<<Electrode Catalyst for Fuel Cell Production Method>>

The method for the production of the electrode catalyst for a fuel cell of the present invention comprises heat-treating carrier particles on which a metal constituting the catalyst metal particles is carried. The electrode catalyst for a fuel cell obtained by the method of the present invention may be the electrode catalyst for a fuel cell described above. The catalyst metal particles and carrier particles described above regarding the electrode catalyst for a fuel cell can be used.

<<Carrying Step>>

The method for the production of the electrode catalyst for a fuel cell of the present invention may include a step of carrying the catalyst metal particles on the carrier particles. The step of carrying the catalyst metal particles on the carrier particles may include contacting the carrier particles with a platinum salt solution and reducing the platinum salt with a reducing agent. Examples of the platinum salt solution include dinitrodiammine platinum nitric acid solutions.

In the step of contacting the carrier particles with a platinum salt solution, the carrier particles can be dispersed in an aqueous solvent and mixed with the platinum salt solution, and in this case, by making the aqueous solvent acidic, the occurrence of precipitation, which may occur when the platinum salt solution is mixed, can be suppressed.

The reducing agent is not particularly limited. An alcohol, for example, ethanol, can be used. In the reduction step, heat treatment can be carried out after the reducing agent is added. The conditions of the heat treatment differ in accordance with the type of reducing agent, and for example, when ethanol is used as the reducing agent, heating can be carried out at a temperature of 60° C. to 90° C. for 1 to 3 hours.

After the reduction step, the platinum particles and carrier particles may be separated from the dispersion by, for example, filtration to obtain platinum particles and carrier particles carrying the platinum particles. After separating the platinum particles and the carrier particles carrying the platinum particles, washing and/or drying may be carried out.

When a platinum alloy is used as the catalyst metal particles, the carrying step may include dispersing the platinum particles and the carrier particles on which they are carried in an aqueous solvent and contacting therewith an acid salt solution of a metal forming the platinum alloy. For example, when the metal forming the platinum alloy is cobalt, a cobalt nitrate solution can be used as the acid salt solution. In this case, the reducing agent can reduce the acid salt of the metal to alloy platinum, to a certain extent, with the metal forming the platinum alloy. After the reduction step, the platinum alloy particles and the carrier particles may be separated from the dispersion liquid by, for example, filtration to obtain the platinum alloy particles and the carrier particles carrying the platinum alloy particles. After separating the platinum alloy particles and the carrier particles carrying the platinum alloy particles, washing and/or drying may be carried out.

<Heat Treatment Step>

After carrying the catalyst metal particles on the carrier particles in this manner, the catalyst metal particles and the carrier particles on which they are carried may be subjected to heat treatment, for example, may be subjected to heat treatment at a temperature of 830° C. for 0.2 hours to 2 hours. It is preferable that this heat treatment be carried out at a high temperature for a relatively short time from the viewpoint of the particle size distribution of the catalyst metal particles.

The heat treatment may be carried out at a temperature of 830° C. or higher, 850° C. or higher, 880° C. or higher, 900° C. or higher, or 930° C. or higher, and the maximum temperature thereof may be 1100° C. or lower, 1050° C. or lower, 1000° C. or lower, 980° C. or lower, 950° C. or lower, 930° C. or lower, 900° C. or lower, or 880° C. or lower.

The time of the heat treatment carried out at 830° C. or higher may be 2 hours or less, 1.8 hours or less, 1.5 hours or less, 1.2 hours or less, 1.0 hours or less, 0.8 hours or less, or 0.5 hours or less. In this heat treatment, the time at which the heat treatment is carried out at 880° C. or higher may be 1.5 hours or less, 1.2 hours or less, 1.0 hours or less, 0.8 hours or less, or 0.5 hours or less, and the time at which the heat treatment is carried out at 920° C. or higher may be 1.0 hours or less, 0.8 hours or less, or 0.5 hours or less. These heat treatments may be carried out for 0.2 hours or more, 0.3 hours or more, 0.5 hours or more, 0.8 hours or more, 1.0 hours or more, or 1.5 hours or more. It can be understood that when such heat treatment is carried out for a long time, the particle size distribution of the catalyst metal particles tends to non-uniformity.

The heat treatment may be carried out at a temperature of 830° C. to 880° C. for 2 hours or less or 1.8 hours or less, may be carried out at a temperature of greater than 880° C. to 920° C. for 1.5 hours or less or 1.2 hours or less, or may be carried out at a temperature of greater than 920° C. to 980° C. for 0.8 hours or less or 0.5 hours or less. For example, the heat treatment may be carried out at a temperature of 880 to 980° C. for 1.5 hours or less, 1.0 hours or less, or 0.5 hours or less.

The heating rate and cooling rate during the heat treatment are not particularly limited as long as the heat treatment can be sufficiently carried out. For example, the heating rate may be 3° C./min or more, 5° C./min or more, 10° C./min or more, or 15° C./min or more, and may be 30° C./min or less, 20° C./min or less, or 15° C./min or less. The cooling rate may be 10° C./min or more, 20° C./min or more, 30° C./min or more, or 50° C./min or more, and may be 80° C./min or less, 50° C./min or less, or 30° C./min or less.

The heat treatment is preferably carried out in an inert atmosphere or a reducing atmosphere so that the carbonaceous material is not oxidized.

<Acid Treatment Step>

The method for the production of the electrode catalyst for a fuel cell of the present invention can further include an acid treatment step.

In the acid treatment step, a PtCo alloy carried on solid carbon carriers is preferably acid-treated at 70 to 90° C., more preferably 75 to 85° C. Due to the acid treatment at such a temperature, Co which does not contribute to the reaction can be sufficiently removed. As a result, elution of Co can be suppressed.

Examples of the acid used in the acid treatment step include inorganic acids (nitric acid, phosphoric acid, permanganate, sulfuric acid, and hydrochloric acid) and organic acids (acetic acid, malonic acid, oxalic acid, formic acid, citric acid, and lactic acid).

The present invention will be further specifically described by way of the following Examples. However, the present invention is not limited thereby.

EXAMPLES

<<Production Examples>>

Example 1

A carbon black having a cumulative volume of pores having a diameter of 2 nm or less of 0.09 cc/g and a BET specific surface area of 1180 $m^2$/g was obtained by subjecting a dendric carbon black (BET specific surface area: 1300 $m^2$/g, cumulative volume of pores having a diameter of 2 nm or less: 0.15 cc/g) as described in Patent Literature 9 to 11 to heat treatment at 2000° C. for 0.5 hours in an inert gas and thereafter carrying out an activation treatment at 480° C. for 5 hours in air.

0.6 g of the carbon black powder was dispersed in 1 L of a 0.1 N aqueous nitric acid solution. To this dispersion liquid, a dinitrodiammine platinum nitric acid solution containing 0.4 g of platinum was added so that the platinum carrying rate was 40% by weight, and 27 g of 99.5% ethanol was further added thereto as a reducing agent and the mixture was sufficiently mixed. Heating was then carried out at 60° C. to 90° C. for 1 to 3 hours using ethanol as a reducing agent. The dispersion liquid after this reduction treatment was repeatedly filtered and washed until the electrical conductivity of the waste liquid of the filtrate became 50 µS/cm or less. The powder cake obtained by filtration and washing was blown and dried at 80° C. for 15 hours or more to obtain platinum-carrying carbon.

The platinum-carrying carbon was dispersed in a quantity of pure water equal to 80 times the amount of the carbon, and an aqueous cobalt nitrate solution was added dropwise thereto. This cobalt nitrate aqueous solution was prepared by dissolving commercially available cobalt nitrate hexahydrate in pure water, and was used so that the molar ratio of platinum:cobalt was 7:1. After the cobalt nitrate aqueous solution was added, sodium borohydride dissolved in pure water was further added dropwise at 1 to 6 times the molar amount of cobalt, and the mixture was stirred for approximately 1 to 20 hours. The dispersion liquid was repeatedly filtered and washed until the electric conductivity of the waste liquid of the filtrate became 5 µS/cm or less. The powder cake obtained by filtration and washing was blown and dried at 80° C. for 15 hours or more to obtain platinum alloy-carrying carbon.

The platinum alloy-carrying carbon obtained in this manner was subjected to heat treatment at 900° C. for 1 hour in an argon atmosphere. As a result, the electrode catalyst for a fuel cell of Example 1 was obtained.

Example 2 and Comparative Examples 1 to 4

The electrode catalysts for a fuel cell of Example 2 and Comparative Examples 1 to 4 were obtained in the same manner as Example 1 except that carbon blacks having a cumulative pore volume and a BET specific surface area as shown in Table 1 were prepared by changing the conditions of the heat treatment to which the carbon black was subjected, and these carbon blacks were used.

Example 3

In order to obtain a carbon porous body as described in Patent Literature 13, lithium hydroxide hydrate was dissolved in pure water so as to achieve a concentration of 0.04 mol/L, whereby 100 mol equivalent of terephthalic acid and 90 mol equivalent of calcium hydroxide were added thereto and mixed. This mixture was left in a sealed state for 48 hours to obtain a composite salt, which was thereafter dried at 100° C. to obtain a carbon black precursor. The precursor was subjected to heat treatment at 600° C. for 5 hours, suspended in pure water, and hydrochloric acid was added thereto and stirred to adjust the pH to 3 or less. The residue obtained by filtration was then dried at 100° C. The dried residue was subjected to heat treatment in vacuum at 2000° C. for 1 hour and subsequently in air at 450° C. for 1 hour to obtain a carbonaceous material as a carbon porous body.

The electrode catalyst for a fuel cell of Example 3 was obtained in the same manner as Example 1 except that the carbonaceous material obtained in this manner was used.

<<Evaluation>>
<BET Specific Surface Area>

The BET specific surface area of the carrier particles was measured in accordance with JIS K6217-2 using a Tri-Star 3000 manufactured by Shimadzu Corporation.

<Cumulative Pore Volume>

The cumulative pore volume was a value measured with a gas adsorption amount measurement device ("Tri-Star 3000" manufactured by Shimadzu Corporation) by the BJH method at a measurement temperature of 77.4 K using nitrogen gas as the adsorbate.

<Particle Diameter Measurement>

The average particle diameter of the produced catalyst metal particles was calculated from the Pt(220) face X-ray diffraction measurement peak using analysis software JADE. The ratio of the catalyst metal particles having a diameter of 2 nm or less was determined from TEM measurement image analysis.

<Initial Catalytic Activity>

The electrode catalysts produced in the Examples and Comparative Examples were dispersed in organic solvents, and the dispersions were applied to Teflon™ sheets to form electrodes. The electrodes were bonded via a polymer electrolyte membrane by hot pressing, and diffusion layers were arranged on both sides of the electrodes to prepare a unit cell of a polymer electrolyte fuel cell.

Cyclic voltammetry (CV) and IV measurements were carried out using a small single cell evaluation device system (manufactured by Toyo Technica Co., Ltd.) at a cell temperature of 80° C. and a relative humidity of both electrodes of 100%.

Regarding the IV measurement, the current was arbitrarily controlled in the range of 0.01 to 1.0 A/cm$^2$. The current value per mass Pt at 0.86 V was defined as the initial catalytic activity.

<Activity Maintenance Rate>

The fuel cell which was tested for the initial catalytic activity was repeatedly charged and discharge for 2000 repetitions, the IV measurement was carried out again. The ratio (%) of the initial catalyst activity to the current value after the charge/discharge test was calculated, and the value was defined as the activity maintenance rate.

<<Results>>

The results are shown in the Table below.

TABLE 1

| | BET Specific Surface Area [m$^2$/g] | Cumulative Pore Volume [cc/g] | | | | Average Particle Diameter [nm] | Ratio of 2 nm or less [%] | Initial Catalytic Activity [A/g @ 0.86 V] | Activity Maintenance Rate [%] |
|---|---|---|---|---|---|---|---|---|---|
| | | 2 nm or less | 6 nm or less | 10 nm or less | Total | | | | |
| Ex 1 | 1180 | 0.09 | 0.84 | 0.92 | 1.29 | 3.4 | 22 | 0.46 | 67 |
| Ex 2 | 950 | 0.07 | 0.68 | 0.74 | 1.18 | 3.5 | 20 | 0.46 | 72 |
| Ex 3 | 903 | 0.05 | 0.59 | 0.81 | 1.20 | 3.0 | 21 | 0.41 | 71 |
| Comp. Ex. 1 | 1300 | 0.15 | 0.90 | 0.96 | 1.29 | 3.3 | 26 | 0.47 | 45 |
| Comp. Ex. 2 | 1200 | 0.13 | 0.83 | 0.89 | 1.28 | 3.4 | 25 | 0.45 | 52 |
| Comp. Ex. 3 | 800 | 0.06 | 0.47 | 0.55 | 1.08 | 3.8 | 15 | 0.35 | 68 |
| Comp. Ex. 4 | 400 | 0.02 | 0.18 | 0.22 | 0.43 | 4.2 | 6 | 0.19 | 63 |

Table 1 reveals that Examples 1 to 3, in which a catalyst containing a carbon black having a cumulative volume of pores having a diameter of 2 nm or less of 0.10 cc/g or less and a BET specific surface area of more than 900 m$^2$/g satisfied both a high initial activity and activity maintenance rate.

REFERENCE SIGNS LIST 10 electrolyte membrane
20 anode electrode layer 21 anode-side gas flow path
22 anode-side gas diffusion layer
23 anode-side separator
30 cathode electrode layer
31 cathode-side gas flow path
32 cathode-side gas diffusion layer
33 cathode-side separator
100 membrane-electrode assembly
200 fuel cell

The invention claimed is:

1. An electrode catalyst for a fuel cell comprising catalyst metal particles containing platinum or a platinum alloy and carrier particles on which the catalyst metal particles are carried, wherein
the carrier particles are a carbonaceous material having a cumulative pore volume of pores having a diameter of 2 nm or less of 0.01 cc/g or more and 0.09 cc/g or less,
a ratio of the cumulative pore volume of pores having a diameter of 2 nm or less to a total cumulative pore volume of the carbonaceous material of 0.01 or more and 0.10 or less, and
a BET specific surface area of more than 900 $m^2/g$.

2. The electrode catalyst according to claim 1, wherein the carbonaceous material has a cumulative pore volume of pores having a diameter of 6 nm or less of 0.25 cc/g or more.

3. The electrode catalyst according to claim 1, wherein the total cumulative pore volume of the carbonaceous material is 1.0 cc/g or more.

4. The electrode catalyst according to claim 1, wherein the BET specific surface area of the carbonaceous material is 1500 $m^2/g$ or less.

5. The electrode catalyst according to claim 1, wherein a ratio of a number of the catalyst metal particles having a diameter of 2 nm or less is 23% or less with respect to a total number of the catalyst metal particles.

6. The electrode catalyst according to claim 1, wherein a number average particle size of the catalyst metal particles is 2.8 to 4.0 nm.

7. A fuel cell comprising the electrode catalyst according to claim 1.

8. The electrode catalyst according to claim 2, wherein the total cumulative pore volume of the carbonaceous material is 1.0 cc/g or more.

9. The electrode catalyst according to claim 2, wherein the BET specific surface area of the carbonaceous material is 1500 $m^2/g$ or less.

10. The electrode catalyst according to claim 3, wherein the BET specific surface area of the carbonaceous material is 1500 $m^2/g$ or less.

11. The electrode catalyst according to claim 2, wherein the cumulative pore volume of pores having a diameter of 6 nm or less of the carbonaceous material is 1.20 cc/g or less.

12. The electrode catalyst according to claim 2, wherein the cumulative pore volume of pores having a diameter of 6 nm or less of the carbonaceous material is 0.50 cc/g or more and 1.00 cc/g or less.

13. The electrode catalyst according to claim 1, wherein a cumulative pore volume of pores having a diameter of 10 nm or less of the carbonaceous material is 0.50 cc/g or more and 1.50 cc/g or less.

14. The electrode catalyst according to claim 1, wherein a cumulative pore volume of pores having a diameter of 10 nm or less of the carbonaceous material is 0.70 cc/g or more and 1.00 cc/g or less.

15. The electrode catalyst according to claim 1, wherein the total cumulative pore volume of the carbonaceous material is 1.10 cc/g or more and 2.00 cc/g or less.

16. The electrode catalyst according to claim 1, wherein the total cumulative pore volume of the carbonaceous material is 1.20 cc/g or more and 1.50 cc/g or less.

17. The electrode catalyst according to claim 1, wherein the ratio of the cumulative pore volume of pores having a diameter of 2 nm or less to the total cumulative pore volume of the carbonaceous material is 0.01 or more and 0.08 or less.

18. The electrode catalyst according to claim 1, wherein the ratio of the cumulative pore volume of pores having a diameter of 2 nm or less to the total cumulative pore volume of the carbonaceous material is 0.01 or more and 0.06 or less.

* * * * *